Jan. 30, 1934.                V. LEWAND                1,945,439
                              TRANSMISSION
                         Filed Jan. 25, 1933          2 Sheets-Sheet 1
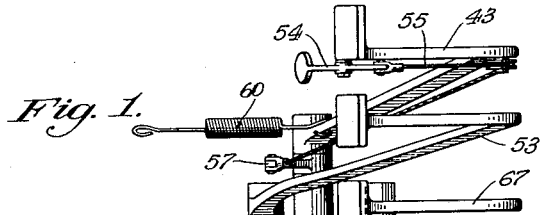
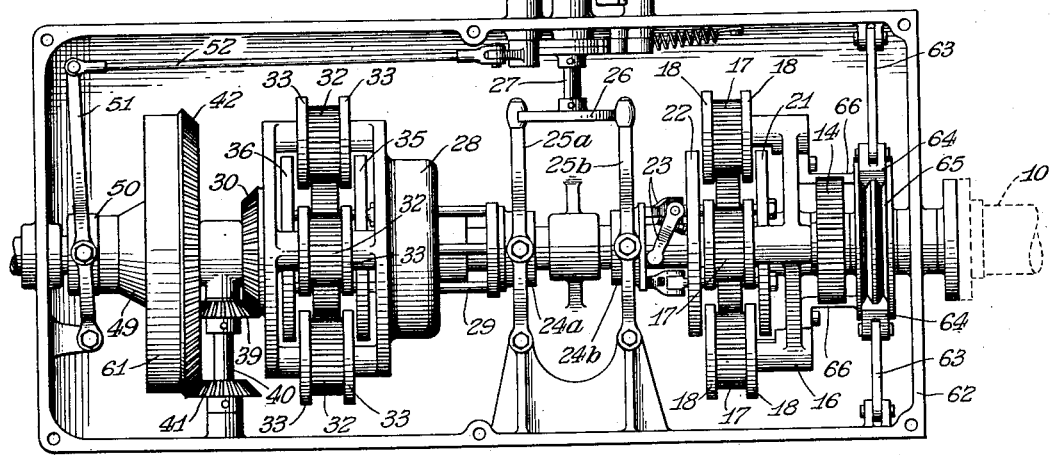
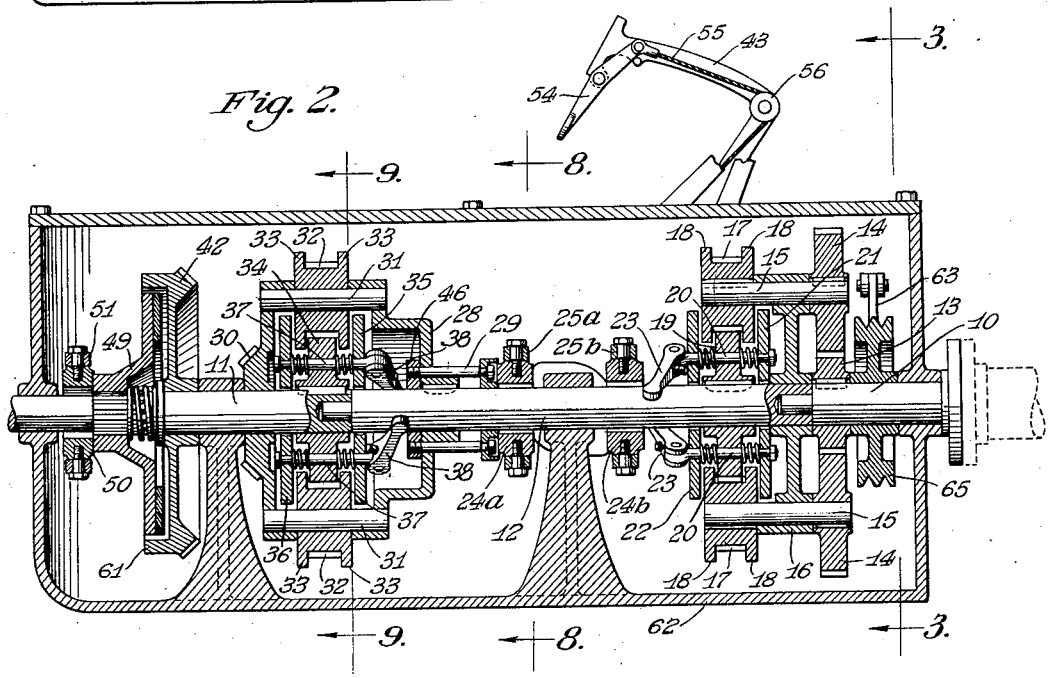
Valentine Lewand, INVENTOR
BY Victor J. Evans & Co.
HIS ATTORNEYS Jan. 30, 1934.   V. LEWAND   1,945,439
TRANSMISSION
Filed Jan. 25, 1933   2 Sheets-Sheet 2
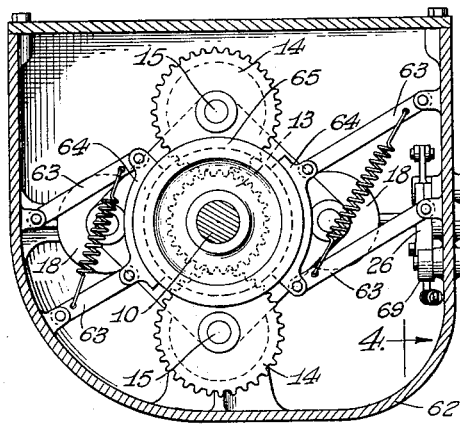
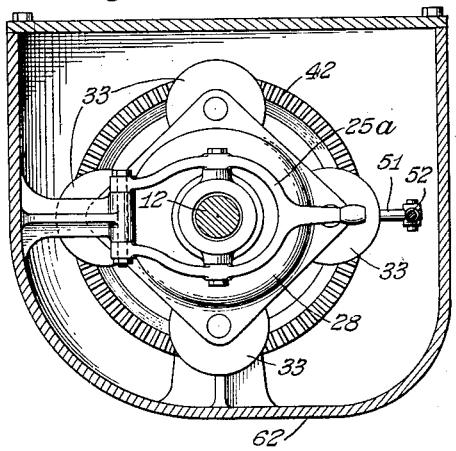
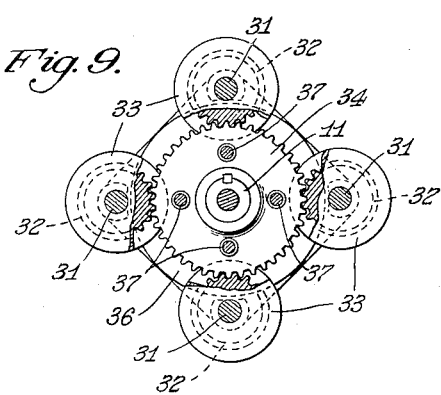
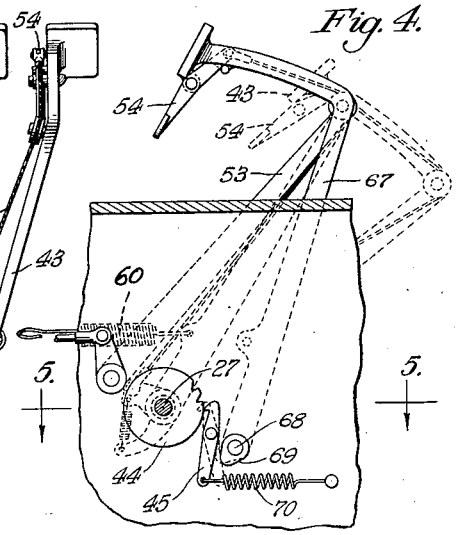
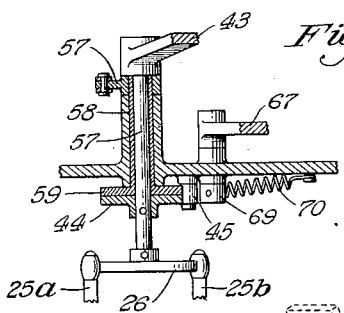
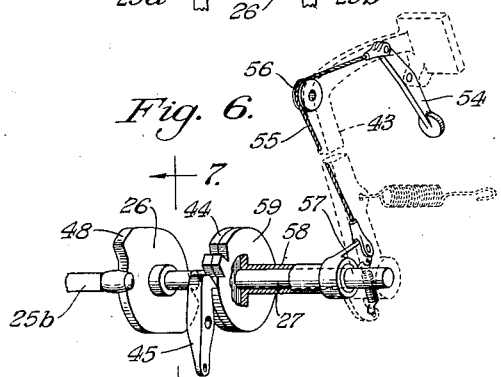
Valentine Lewand,
INVENTOR
BY Victor J. Evans & Co.
HIS ATTORNEYS Patented Jan. 30, 1934

1,945,439

UNITED STATES PATENT OFFICE 1,945,439

TRANSMISSION

Valentine Lewand, Chicago, Ill., assignor of one-third to Frank Weinder and one-third to Joseph Lewand, both of Chicago, Ill.

Application January 25, 1933. Serial No. 653,510

3 Claims. (Cl. 74—34)

This invention relates to certain novel improvements in transmissions.

Objects of this invention are: to provide an improved transmission for automotive vehicles; to provide a transmission having a foot-operated control mechanism instead of the customary hand-operated gear shift mechanism; and to provide a transmission having two forward speeds and including a foot-operated shift mechanism by the depression of which the forward speeds are successively obtainable.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a top plan view of the new transmission;

Fig. 2 is a longitudinal vertical sectional view of the same;

Fig. 3 is a transverse vertical sectional view on line 3—3 in Fig. 2;

Fig. 4 is a fragmentary detail view of the foot-operated shifting mechanism taken on line 4—4 in Fig. 3;

Fig. 5 is a sectional view on line 5—5 in Fig. 4;

Fig. 6 is a perspective detail view of the foot-operated shifting mechanism;

Fig. 7 is a sectional view on line 7—7 in Fig. 6;

Fig. 8 is a sectional view on line 7—7 in Fig. 2; and

Fig. 9 is a sectional view on line 9—9 in Fig. 2.

Forward speed mechanism

In the drawings the drive shaft of an automotive vehicle is indicated at 10 and the driven shaft at 11. Arranged intermediate the drive shaft 10 and driven shaft 11 and having its ends piloted into, and rotatable relative to, the shafts 10 and 11, is an intermediate shaft 12.

Fast on the drive shaft 10 is a gear 13 which meshes with a pair of gears 14 that are carried by and are keyed to stub shafts 15. These stub shafts 15 are journaled in a body 16 which floats on, or is loosely rotatable upon, the intermediate shaft 12. Rotatably mounted on the inner end of each of the stub shafts 15 is a gear 17 and each of these gears 17 has a pair of annular flanges 18. Keyed to the intermediate shaft 12 is a gear 19 which meshes with the gears 17 and slidably projected through openings formed in the gear 19 are pins 20. These pins 20 are carried by a clutch disc or plate 21 which floats on the shaft 10 between the gears 17 and the body 16 (Fig. 2). Slidably mounted upon the pins 20 is a second clutch disc or plate 22 which also floats on the shaft 10; the clutch plates 21 and 22 being urged apart, out of engagement with the flanges 18 of the gears 17 by springs that are arranged on the pins 20. Pivotally connected to the pins 20 at their inner ends are bell crank levers 23.

Floating on the shaft 12 are spaced clutch collars 24a and 24b to which are pivotally connected, respectively, clutch yokes 25a and 25b. One end of each of these yokes 25a and 25b bears against a cam 26 that is carried by a foot-operated rock shaft 27.

Keyed to the intermediate shaft 12 is a body 28 in which is slidably mounted, for movement axially of the shaft 12, a cage 29. Floating on the driven shaft 11 is a beveled gear body 30. Rotatably mounted on stub shafts 31 that are journaled in the gear body 28 and in the gear body 30 are gears 32, each of which has a pair of spaced annular flanges 33 (Figs. 1 and 2). These gears 32 mesh with a gear 34 that is keyed to the driven shaft 11.

Floating on the driven shaft 11 on opposite sides of the gears 32 are clutch plates or discs 35 and 36, which are similar, respectively, to the clutch plates 22 and 21. The clutch plate 36 carries pins 37, which are similar to the pins 20, and the clutch plate 35 is slidably mounted upon these pins 37. Pivotally attached to the inner ends of these pins 37 are bell crank levers 38, which are similar to the levers 23. The clutch plates 35 and 36 are urged apart out of engagement with the flanges 33 of gears 32, by springs that are arranged on the pins 37. Fast on the shaft 27 is the forward speed shift lever 43.

*Shifting from neutral position to forward low speed and operation in the latter*

The parts are shown in neutral position in Figs. 1 and 2. When the parts are in this position and the drive shaft 10 is operated, the rotation of the drive shaft 10 is ineffective to turn the driven shaft 11 since in this position the rotation of the drive shaft 10 merely causes the gears 32 to idle around the gear 34, as follows: The rotation of shaft 10 in neutral position of the parts (Figs. 1 and 2) is transmitted through gear 13 to gears 14, shafts 15, gears 17, gear 19, intermediate shaft 12, body 28 and thence through shafts 31 to the gears 32 which thus idle around the gear 34 that is keyed to the driven shaft 11; wherefore the latter remains motionless.

To shift the parts into forward low speed the gear shift pedal 43 is depressed, part way down its arc of movement, thereby turning the shaft 27 and cam 26 (counterclockwise as seen in Figs. 6 and 7 and clockwise as seen looking from bottom to top of the sheet in Figs. 1 and 5). This movement of cam 26 causes the yokes 25a and 25b to ride over the rise portions 47, 48 of the cam 26, thus spreading the yokes 25a and 25b apart and pivoting the yoke 25a counterclockwise (Fig. 1) and urging the clutch collars 24a and 46 and pins 29 to the left (Fig. 2) on the shaft 12; which in turn causes the clutch collar 46 to engage the bell crank levers 38 and pivot the latter; and this movement of the bell crank levers 38 in turn forces the clutch discs 35 and 36 together into gripping engagement with the flanges 33 of the gears 32, whereupon power is transmitted from the drive shaft 10 to the driven shaft 11 as follows: From drive shaft 10 to gear 13, gears 14, shafts 15, gears 17, gear 19, intermediate shaft 12 to the body 28, and, since the clutch discs 35 and 36 are clamped to the flanges 33 of gears 32, the body 28, shafts 31, gears 32, gear 34, and driven shaft 11 all turn as a unit and power is thus transmitted in forward low speed from the drive shaft 10 to the driven shaft 11.

The parts are held in this forward low speed position by engagement of a spring urged latch dog 45 with a notched disc 44 that is arranged on the shaft 27.

*Shifting from low forward speed to high forward speed or direct drive and operation in the latter*

To shift from low forward speed to high forward speed, or direct drive, the speed shift clutch pedal 43 is further depressed, causing the shaft 27 and cam 26 to turn (counterclockwise, Figs. 6 and 7), whereupon the rise 48 on the cam 26 engages the yoke 25b and pivots the latter (clockwise, Fig. 1). This movement of yoke 25b urges the clutch collar 24b into engagement with the bell crank levers 23 and the latter in turn urge the clutch discs 22 and 21 into clamping engagement with the flanges 18 of gears 17 whereupon power is transmitted from the drive shaft 10 to the driven shaft 11 as follows: From the drive shaft 10, through the gear 13 to the gears 14 but since the engagement of the clutch discs 21 and 22 with the flanges 18 of gears 17 prevents the latter from revolving upon the shafts 15 the gears 14, shafts 15, gears 17, gear 19 and intermediate shaft 12, all rotate as a unit with the drive shaft 10; and this motion of intermediate shaft 12 is transmitted through the body 28, shafts 31, gears 32, and gear 34 to the driven shaft 11; the clamping engagement of the clutch discs 35 and 36 with the flanges 33 of gears 32 preventing rotation of the gears 32 upon and relative to the shafts 31 and causing the body 28, shafts 31, gears 32 and gear 34 to rotate as a unit with the shafts 12 and 11.

*Reverse speed mechanism*

Floating, that is freely rotatable, on the driven shaft 11 is a beveled gear 42 which meshes with an idler gear 41 that is keyed to a stub shaft 40. This stub shaft 40 also has fast thereon a second idler gear 39 which meshes with the beveled gear 30 (Fig. 1). Splined on the driven shaft 11 (Fig. 2) is a clutch disc 49 and slidable axially on the shaft 11 on the outer side of clutch disc 49 is a clutch collar 50 to which is pivotally connected a reversing lever 51. This reversing lever 51 in turn is pivotally connected to a rod 52 which is operatively connected through a shaft to the reversing pedal 53.

To shift from either forward speed to reverse speed it is first necessary to disengage the latch dog 45 from the notched disc 44 and to accomplish this I provide the following mechanism: To this end a trip lever 54 is pivotally attached to the forward speed clutch pedal 43 (Figs. 4 and 6) and a flexible element 55 is led from one end of this trip 54 over a guiding sleeve 56 arranged on the pedal 43, to an arm 57 which is fast upon a tubular member 58 (Fig. 6) that surrounds the shaft 27. Formed on this tubular member 58 is a second notched disc 59 (Figs. 5 and 6).

To return the parts from either low or high forward speed to neutral position (as in Figs. 1 and 2) the trip lever 54 is depressed (counterclockwise, Fig. 4, clockwise Fig. 6) thereby turning the arm 57; tubular member 58, and notched disc 59, (counterclockwise, Fig. 6). This movement of disc 59 releases the latch dog 45 from the corresponding notches in both discs 59 and 44 whereupon the forward speed clutch pedal 43, shaft 27 and cam 26 are returned to neutral position (as in Figs. 1 and 2) by means of a spring 60.

The reverse speed clutch pedal 53 may then be depressed and this movement of the same acts through the rod 52, and lever 51 to slide the clutch collar 50 on the shaft 11 (to the right in Fig. 2), thereby forcing the clutch disc 49 into clamping engagement with the clutch face 61 of gear body 42. Gear 42 is thus made fast to the driven shaft 11 and the direction of rotation of the driven shaft 11, relative to the direction of intermediate shaft 12 and gear 30, is thereby reversed because of the gears 39 and 41.

Pivotally mounted on the transmission casing 62 are two pairs of arms 63, one pair of these arms being disposed on each side of the drive shaft 10. Carried by and pivotally attached to each of these pairs of arms 63 is a shoe 64 and these shoes 64 ride upon a drum 65 that floats or is rotatably mounted upon the drive shaft 10. This drum 65 is attached (Fig. 1) by arms 66 to the body 16.

When the clutch discs 21 and 22 are out of engagement with the flanges 18 of gears 17 and the drive shaft 10 is set in motion (clockwise, for example, in Fig. 3) there is a tendency for the body 16 to commence a retrograde or counterclockwise movement by reason of the fact that the gear 13, which is keyed to the drive shaft 10, meshes with the gears 14, and imparts an opposite (counterclockwise, Fig. 3, in the example) rotation to these gears 14. This tendency of the body 16 is overcome and counteracted by the shoes 64 which, bearing down upon the drum 65 with their own weight and the weight of the arms 63 and being attached by the arms 66 to the body 16, prevent the aforesaid tendency of the body 16 to undergo retrograde movement when the drive shaft 10 is set in motion.

*Clutch latch release*

The brake pedal 67 is mounted on a shaft 68 (Fig. 4) and fast on this shaft 68 is a cam 69 (Figs. 4 and 5) which is adapted for engagement with the latch dog 45. When the clutch pedal 43 is depressed a spring 70 engages this dog with the notched discs 44—59 to hold the clutch pedal depressed, thereby holding the transmission in either low or high forward speed. However, if it be desired to stop the vehicle the brake pedal 67 is depressed, thereby turning the shaft 68 and cam 69 (clockwise, Fig. 4). This movement causes the cam 69 to engage the dog 45 and turn the same (clockwise, Fig. 4) out of engagement with the notched discs 44—59, and thus releasing the clutch pedal 43 and the transmission mechanisms.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. A transmission comprising the combination of a drive shaft and a driven shaft, a speed shift clutch pedal, a low forward speed transmission mechanism and a high forward speed transmission mechanism for operatively interconnecting said shafts, clutch mechanisms associated with said transmission mechanisms and pedal and successively operable by depression of said pedal to render said transmission mechanisms effective in their aforementioned order, a latch mechanism associated with said pedal for holding the same in depressed position, a brake pedal, and means operable by depression of the brake pedal to release said latch mechanism from engagement with the clutch pedal.

2. A transmission for vehicles comprising the combination of a drive shaft and a driven shaft, a low forward speed transmission mechanism for operatively interconnecting said shafts, a high forward speed transmission mechanism for operatively interconnecting said shafts, a clutch speed shift pedal, a clutch mechanism associated with each of said transmission mechanisms and with said pedal and successively rendered effective by depression of said pedal to render said transmission mechanisms effective and to shift from one forward speed to another, a latch mechanism associated with said pedal for releasably latching the same in depressed position, a brake pedal, and means operable by depression of the brake pedal to release said latch mechanism from engagement with said pedal.

3. A transmission for vehicles comprising the combination of a drive shaft and a driven shaft, a low forward speed transmission mechanism for operatively interconnecting said shafts, a high forward speed transmission mechanism for operatively interconnecting said shafts, a clutch speed shift pedal, a clutch mechanism associated with each of said transmission mechanisms and with said pedal and successively rendered effective by depression of said pedal to render said transmission mechanisms effective and to shift from one forward speed to another, a latch mechanism associated with said pedal for releasably latching the same in depressed position, a reverse speed mechanism associated with the driven shaft, a reverse pedal, and a clutch mechanism associated with the reverse pedal and rendered effective by depression of the latter to reverse the speed of the driven shaft.

VALENTINE LEWAND.